(12) United States Patent
Carey et al.

(10) Patent No.: US 11,501,047 B2
(45) Date of Patent: Nov. 15, 2022

(54) ERROR INJECTION FOR TIMING MARGIN PROTECTION AND FREQUENCY CLOSURE

(71) Applicant: INTERNATIONAL BUSINESS MACHINES CORPORATION, Armonk, NY (US)

(72) Inventors: Sean Michael Carey, Dutchess, NY (US); Richard Frank Rizzolo, Red Hook, NY (US); Bodo Hoppe, Boeblingen (DE); Divya Kumudprakash Joshi, Hobli (IN); Paul Jacob Logsdon, Poughkeepsie, NY (US); Sreekala Anandavally, Poughkeepsie, NY (US); William Rurik, Saint Paul, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 420 days.

(21) Appl. No.: 16/692,129

(22) Filed: Nov. 22, 2019

(65) Prior Publication Data

US 2021/0157963 A1     May 27, 2021

(51) Int. Cl.
    *G06F 30/3312*     (2020.01)
(52) U.S. Cl.
    CPC .................. *G06F 30/3312* (2020.01)
(58) Field of Classification Search
    CPC .......... G06F 30/3312; G06F 2117/02
(Continued)

(56) References Cited

U.S. PATENT DOCUMENTS

| 6,148,425 A | 11/2000 | Bhawmik et al. |
| 6,701,505 B1 | 3/2004 | Srinivasan |

(Continued)

FOREIGN PATENT DOCUMENTS

WO     2013043615 A1     3/2013

OTHER PUBLICATIONS

Pattunarajam et al., "A Novel Test Path Selection Based on Switching Activity and Its BIST Implementation", 2014 IJARCET. 6p.
(Continued)

*Primary Examiner* — Juan C Ochoa
(74) *Attorney, Agent, or Firm* — Cantor Colburn LLP; Jeffrey Ingalls

(57) ABSTRACT

A non-limiting example of a computer-implemented method for error injection includes executing a pre-silicon operation on a simulated chip verifying that a plurality of latches from a timing simulation set error checkers when run against a manufacturing test suite in order to generate a cross-reference file containing latch entries in a table. It executes a first post-silicon operation on a hardware chip based on the simulated chip to determine empirically that timing latches from logic built-in self tests ("LBIST") trigger the same error checkers set by the plurality of latches verified in the simulated chip. The method updates the cross-reference file based on the results of the determination. The method executes a second post-silicon operation on the hardware chip to improve chip frequency by working around functional checkers using the cross-reference file and updating the cross-reference file based on the results of the improving.

20 Claims, 10 Drawing Sheets

(58) Field of Classification Search
USPC .............................................. 703/14–17, 19
See application file for complete search history.

(56) References Cited

U.S. PATENT DOCUMENTS

| | | |
|---|---|---|
| 8,028,260 B1 | 9/2011 | Ravi |
| 8,341,473 B2 | 12/2012 | Bertacco et al. |
| 2006/0242506 A1* | 10/2006 | Warnock ........ G01R 31/318594 714/726 |
| 2009/0112557 A1* | 4/2009 | King ................... G06F 30/3312 703/15 |
| 2009/0210763 A1* | 8/2009 | Eckelman ...... G01R 31/318536 714/E11.002 |
| 2015/0331040 A1* | 11/2015 | Bernon-Enjalbert ........................ H01L 29/0642 438/424 |
| 2018/0252768 A1 | 9/2018 | Rajski et al. |

OTHER PUBLICATIONS

Mell et al., "The NIST Definition of Cloud Computing", Recommendations of the National Institute of Standards and Technology, Sep. 2011. 7p.

* cited by examiner

300

| # | Latch Source | Latch Name | Check Source | Checker Name | EMP BIST? | EMP PLL? | EMP SEL? | Notes |
|---|---|---|---|---|---|---|---|---|
| 1 | timing | LOL_joke(1) | Sim | None | N/A | N/A | N/A | sensor |
| 2 | timing | CMU_robo(2) | Sim | Beagle_hld(2) Hound_hld(0) | N/A | N/A | N/A | |
| 3 | timing | LSU_ftbal(3) | Sim | Newfie_hld(3) | N/A | N/A | N/A | |
| 4 | timing | MIT_nerd(4) | Sim | Lab_hld(4) | N/A | N/A | N/A | |
| 5 | timing | RIT_safe(5) | Sim | Husky_hld(5) | N/A | N/A | N/A | |

| ID | Latch Source | Latch Name | Clock Source | Cascaded Name | BMD Inst? | BMD Ptr? | BMD Str? | Notes |
|---|---|---|---|---|---|---|---|---|
| 0 | timing | LOL_joke(1) | N/A | None | No | N/A | N/A | sensor |
| 1 | timing | CMU_robo(2) | Sim | Beagle_hld(2) Hound_hld(0) | No | N/A | N/A | |
| 2 | Timing, LB | LSU_ftbal(3) | Sim | Newfie_hld(3) | Yes | N/A | N/A | |
| 3 | timing | MIT_nerd(4) | Sim | Lab_hld(4) | No | N/A | N/A | |
| 4 | Timing, LB | RIT_safe(5) | Sim | Husky_hld(5) | Yes | N/A | N/A | |
| 5 | LB | RPI_iceh(6) | sim | Dachs_hld(6) | Yes | N/A | N/A | |
| 6 | LB | BYO_wine(7) | N/A | None | Yes | N/A | N/A | |
| 7 | LB | UCB_hipp(8) | sim | Poodle_hld(8) | Yes | N/A | N/A | |

| # | Latch Source | Latch Name | Check Source | Checker Name | PMP TBIST? | PMP PLE? | PMP SLE? | Notes |
|---|---|---|---|---|---|---|---|---|
| 1 | timing | LOL_joke(1) | N/A | None | No | No | No | sensor |
| 2 | timing | CMU_robo(2) | Sim | Beagle_hld(2) Hound_hld(0) | No | No | No | Timing miscorrelation |
| 3 | Timing, LB | LSU_ftbal(3) | Sim | Newfie_hld(3) | Yes | No | No | Add workload |
| 4 | timing | MIT_nerd(4) | Sim, SLE | Lab_hld(4) | No | No | Yes | |
| 5 | Timing, LB | RIT_safe(5) | Sim, PLE, SLE | Husky_hld(5) | Yes | Yes | Yes | Tune effective |
| 6 | LB | RPI_iceh(6) | sim | Dachs_hld(6) | Yes | No | No | Checker intentionally masked |
| 7 | LB | BYO_wine(7) | SLE | None | Yes | No | Yes | Cannot tune |
| 8 | LB | UCB_hipp(8) | Sim, PLE, SLE | Poodle_hld(8) | Yes | Yes | Yes | Tune effective |

FIG. 7

ERROR INJECTION FOR TIMING MARGIN PROTECTION AND FREQUENCY CLOSURE

BACKGROUND

The present invention generally relates to critical timing paths in a computer and more specifically, to error injection for timing margin protection and frequency closure.

Critical timing paths are more exposed to failures than other random paths because they have less voltage and frequency margin. The critical path is the path between an input and an output with the maximum delay. Timing margin defines the difference between the actual change in a signal and the latest time at which the signal can change in order for an electronic circuit to function correctly.

SUMMARY

Embodiments of the present invention are directed to a computer-implemented method for error injection in a chip. A non-limiting example of the computer-implemented method includes executing, by a processor, a pre-silicon operation on a simulated chip to determine when a plurality of latches from a timing simulation set error checkers when run against a manufacturing test suite in order to generate a cross-reference file containing latch entries in a table. Each latch entry and its associated checkers are added to the cross-reference file. The method executes by the processor, a first post-silicon operation on a hardware chip based on the simulated chip to determine empirically that timing latches from logic built-in self tests ("LBIST") trigger the same error checkers set by the plurality of latches verified in the simulated chip. The method updates the cross-reference file based on the results of the determination. The method executes, by the processor, a second post-silicon operation on the hardware chip to improve chip frequency by unlayering and working around functional checkers using the cross-reference file and updating the cross-reference file based on the results of the improving. The method provides, by the processor, the cross-reference file to a user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts a sample XREF file following the pre-silicon stage operation in accordance with one or more embodiments of the present invention;

FIG. 5 depicts a sample XREF file following the post-silicon stage operation one in accordance with one or more embodiments of the present invention;

FIG. 7 depicts a sample XREF file following the post-silicon stage operation two in accordance with one or more embodiments of the present invention;

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention provide for discovery of critical timing latches and fixes prior to design release. A set of critical timing latches is selected from a timing tool, and these are targeted for error injection during cycle simulation before a design is released. The cycle simulation uses test patterns from a manufacturing functional test suite to mimic what is done in wafer, module or system testing. The cycle simulation output during fault injection provides a list of checkers (or no checker) that are associated with the fault on each critical timing latch. A checker is an error reporting register which is set when an error occurs in the processor, which can be due to a timing critical fail.

Turning now to an overview of technologies that are relevant to aspects of the invention, first pass hardware is always slower than a final desired frequency, and finding and fixing critical paths is a required activity. Once paths are identified, timing improvements are sought either by clock adjustments or by design actions to improve the frequency on the next pass of the hardware design. Since there is often little time between first pass design hardware and second pass design release, the final frequency of a processor depends fundamentally on how quickly critical paths can be identified, "unlayered", and fixed.

Figure 1:
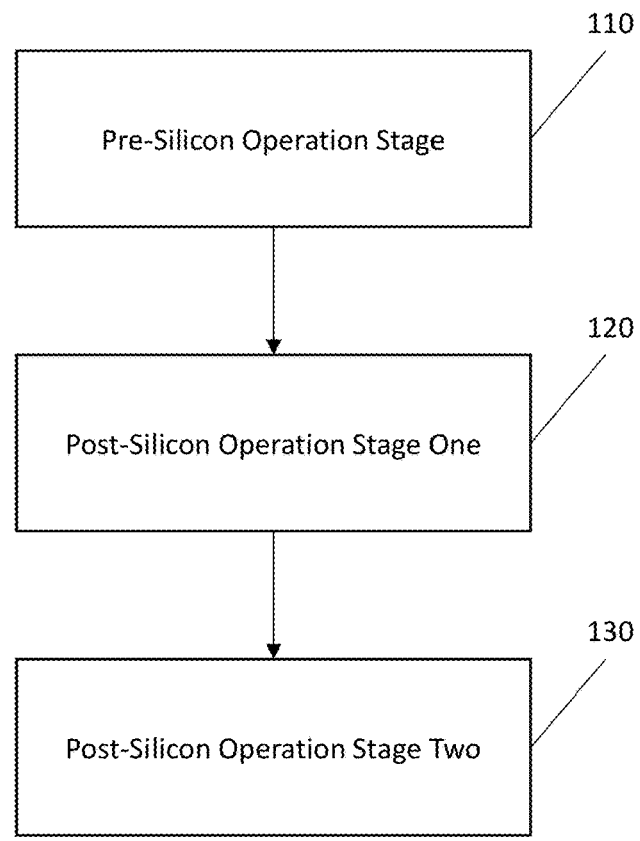
FIG. 1 depicts different phases of testing critical paths in accordance with one or more embodiments of the present invention.

Functional paths generate fails that are very difficult to diagnose. Sizeable cones feed error checkers that can be several cycles downstream of the initial failing latch. Intense manual effort is often needed to determine failing latches and clock adjustments. Often the actual most critical paths are not predicted by the timing tool, and the predicted most critical paths are not accurate. Correlation of predicted versus actual fails has been hampered by the limited diagnostic capability of functional tests. As a result, the design effort is often not optimal. Time is spent on fixing paths that are not actually critical versus fixing the actual critical paths Turning now to an overview of the aspects of the invention, one or more embodiments of the invention address one or more of the above-described shortcomings of the prior art by providing a method to assure that predicted critical paths are tested. Embodiments of the invention improve the time to unlayer actual critical paths and thus the time to close on frequency. Unlayering critical paths is the diagnostic process wherein failing circuits are isolated, out of all circuits in the design, using LBIST and a manufacturing test suite. Embodiments of the invention provide a better, faster way to correlate actual timing fails to predicted timing fails with the result of improving timing tool accuracy Turning now to a more detailed description of aspects of the present invention, FIG. 1 depicts different phases of testing critical paths 100 in accordance with one or more embodiments of the present invention. A cross-reference ("XREF") file is sequentially generated over time. The XREF file categorizes latches for timing tool correlation with hardware, test coverage (LBIST and functional), and error checker coverage. The XREF file is built through structural tests and functional tests. Structural tests apply random patterns to a chip and its logic that might not necessarily be indicative of how a customer would use a chip, but perform diagnostics in an efficient and thorough fashion. Functional tests exercise a chip and its logic in a fashion that a customer would use the chip and logic.

In a pre-silicon operation stage (block 110), a processor determines if the most critical latches from a timing simulation set error checkers when run against a manufacturing test suite in simulation. Error checkers verify proper operation of a circuit, and detection of predicted timing critical fails. Following creation of the chip in silicon, a post-silicon operation stage one (block 120) determines if empirically determined timing critical latches from LBIST will set functional checkers. If so, that may speed frequency closure if functional tests trigger the same checkers triggered during the simulation. Following stage one, a post-silicon operation stage two (block 130) improves chip frequency in a rapid fashion by unlayering and working-around the critical empirical functional checkers one-by-one using the XREF file. Each of these stages will be discussed in greater detail below.

Figure 2:
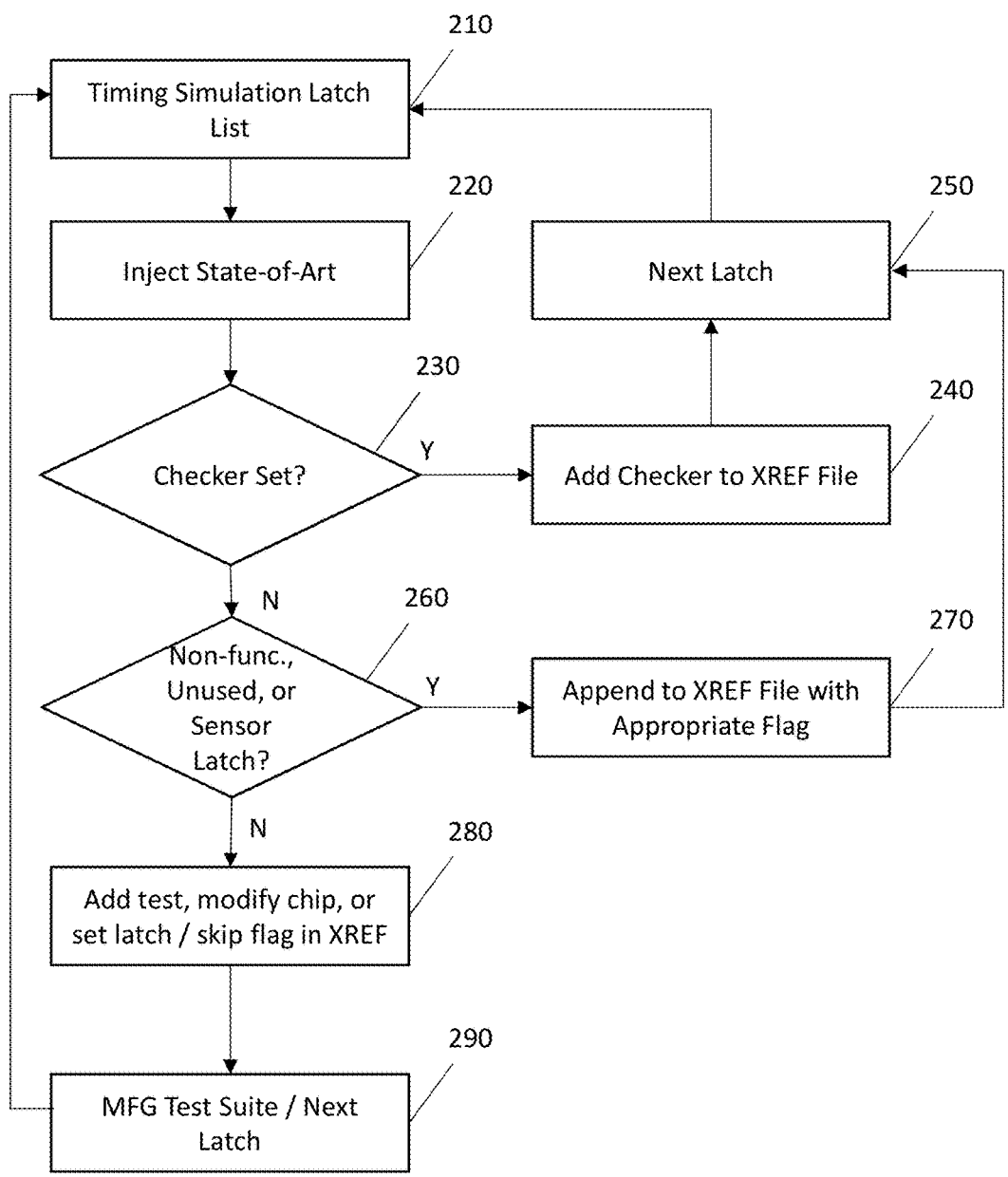
FIG. 2 depicts a pre-silicon stage operation method in accordance with one or more embodiments of the present invention.

FIG. 2 depicts a pre-silicon stage operation method 110 in accordance with one or more embodiments of the present invention. This method 110 verifies that the most critical latches from the timing simulation set error checkers when run against a manufacturing test suite in simulation. A timing simulation latch list is retrieved and a first latch is selected (block 210). State-of-Art latch stimulus is injected into a simulation (block 220). "State-of-Art" error inject refers to the process where a latch is forced, in a simulation environment, to a known value. If an injected latch sets a checker (block 230), a line is entered into the XREF file (block 240) with the latch and the corresponding checker is set. A single injected latch may set more than one checker. The next latch is then selected (block 250) and flow returns to block 210.

If a latch does not set a checker (block 230), there are several options. First, tests can be added to a manufacturing test suite to attempt to set a checker. Second, the chip is modified in design so the latch sets a checker. Third, a flag can be set for latches that by design need not set a checker. Finally, the checker field is left blank in all cases. This is described further below.

If the latch is a non-functional, unused, or sensor latch, the latch is appended to the XREF file with an appropriate flag designating the type of latch (block 270) and the next latch is selected (block 250). If it is not a non-functional, unused, or sensor latch, additional tests are added, the chip may be modified, or the latch set, and no flag is set in the XREF file (block 280). Experts may be consulted at this stage, as well. A manufacturing test suite is then executed and the next latch selected (block 290).

FIG. 3 depicts a sample XREF file 300 following the pre-silicon stage operation in accordance with one or more embodiments of the present invention. The XREF file contains a listing of rows of latches, in this case 1-5. The Latch Source and Latch Name are provided in the next two columns. The check source is listed as sim because it comes from a pre-silicon simulation. The Checker Name is next provided, followed by columns for LBIST, processor level exerciser ("PLE"), and system level exerciser ("SLE") flags followed by a notes column. In this example XREF file 300, the first latch is a timing latch that does not show a checker in the simulation. Thus, a designer may decide that a workload needs to be modified in the manufacturing test suite, the design needs to be modified, or the latch is sensor related (in which case the latch is a non-critical sensor). For latch two, multiple checkers have been found. For latches three through five, a checker was found in the simulation.

In accordance with one or more embodiments of the present invention, once the pre-silicon state operation is completed, LBIST diagnostics are performed next. LBIST diagnostics have many advantages. LBIST is typically run before functional patterns so data is collected earlier. LBIST can quickly determine multiple timing critical latches on a single chip. This is contrasted with functional patterns that can usually identify only the first (most critical) checker. If the functional checker is not in the XREF list it can be time consuming to determine the failing latch and the workaround.

If the LBIST empirical latch is already in the XREF file due to earlier identification a flag is set to indicate it was empirically found by LBIST. If the latch is not present a line is added to the XREF file with the latch name and the LBIST flag. The inject procedure is then followed to see if a checker is set. If a latch sets a checker it is added to the XREF file. If a latch does not set a checker, the same procedure is followed as in the pre-silicon stage operation. This is described in more detail with respect to FIG. 4.

Figure 4:
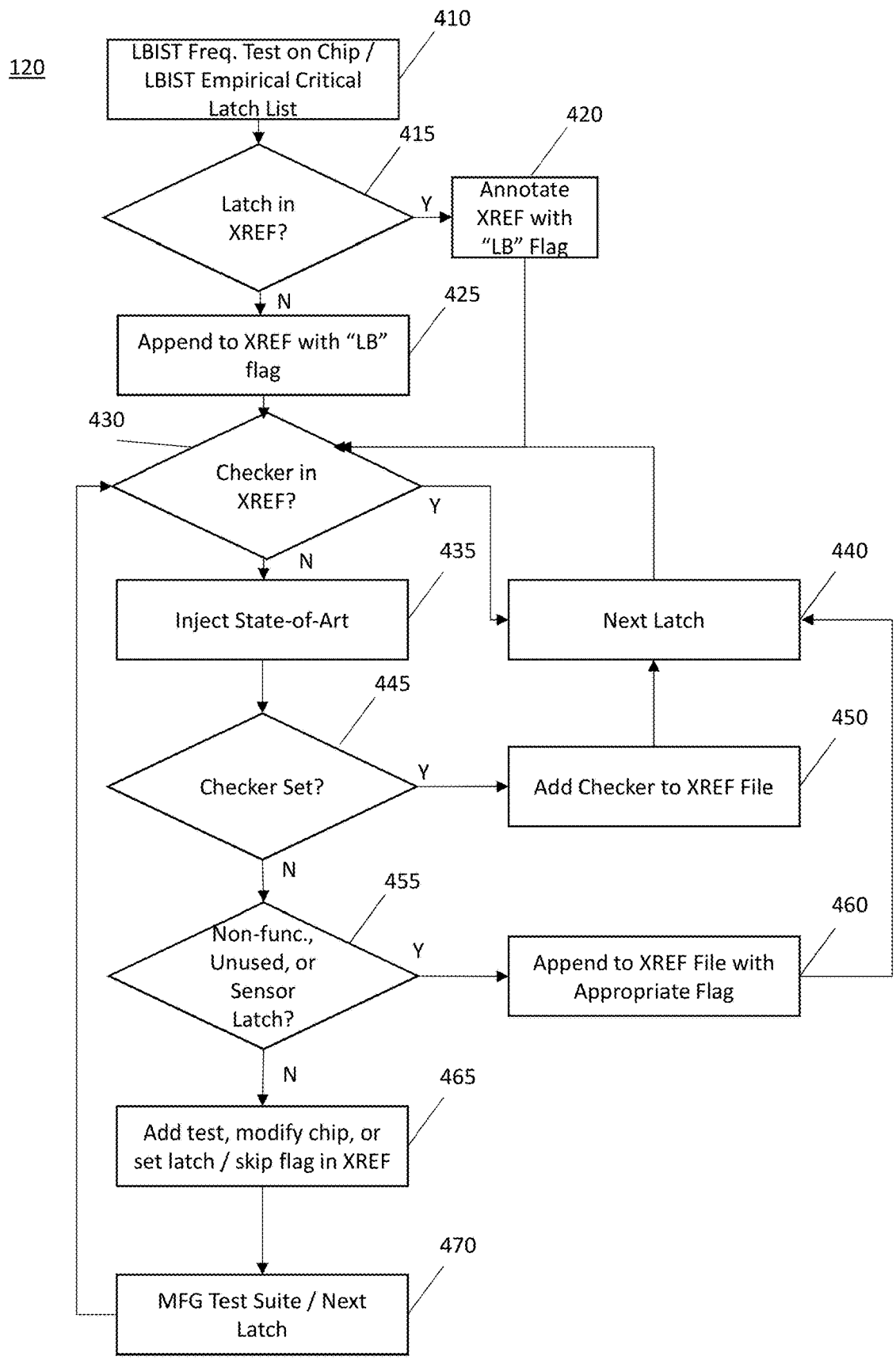
FIG. 4 depicts a post-silicon stage operation stage one method in accordance with one or more embodiments of the present invention.

FIG. 4 depicts a post-silicon stage operation stage one method 120 in accordance with one or more embodiments of the present invention. A post-silicon operation stage one method 120 determines if empirically determined timing critical latches from LBIST will set functional checkers. An LBIST frequency test is performed on chip for each latch in an LBIST empirical critical latch list (block 410). If the latch is already in the XREF file (block 415), the entry in the XREF file is annotated with an LB flag (block 420). If not, the latch is appended to the XREF and noted with an LB flag (block 425).

The remaining blocks are the same as in the pre-silicon operation stage. A test is made to see if the checker is in the XREF file (block 430), and, if so, the next latch is selected (block 440) and flow returns to block 430. If the checker is not in the XREF file, the latch is injected (block 435). If the checker is set, the checker is added to the XREF file (block 450) and the next latch is selected (block 440).

If a latch does not set the checker (block 445), there are several options. First, tests can be added to a manufacturing test suite to attempt to set a checker. Second, the chip is modified in design so the latch sets a checker. Third, a flag can be set for latches that by design need not set a checker. Finally, the checker field is left blank in all cases. This is described further below.

If it is a non-functional, unused, or sensor latch, the latch is appended to the XREF file with an appropriate flag designating the type of latch (block 450) and the next latch is selected (block 440). If it is not a non-functional, unused, or sensor latch, additional tests are added, the chip may be modified, or the latch set, and no flag is set in the XREF file (block 465). Experts may be consulted at this stage, as well. A manufacturing test suite is then executed and the next latch selected (block 470).

FIG. 5 depicts a sample XREF file 300 following the post-silicon stage operation one in accordance with one or more embodiments of the present invention. The XREF file has now been appended with additional information following the post-silicon stage operation one. The first five latches were previously identified and three new latches, six through eight, have been identified in the post-silicon stage operation one. The first latch has no additional information added. The second latch has no match following LBIST injections, so there is a potential timing tool miscorrelation or the LBIST may be untestable. The third latch shows that the checker in the simulation matches the checker in the LBIST injection of the post-silicon stage operation one. The fourth latch has no match following LBIST injections, so there is a potential timing tool miscorrelation or the LBIST may be untestable. The fifth latch shows that the checker in the simulation matches the checker in the LBIST injection of the post-silicon stage operation one.

The sixth through eighth latches were found through the LBIST injection. The sixth and eight latches identify a checker not found in the pre-silicon stage operation. The seventh latch is found by injecting LBIST empirically but does not identify a checker. This signals that it may be an LBIST only, and there may be a need to discuss this with the design team.

A post-silicon stage operation two is now performed. The purpose is to improve chip frequency in a rapid fashion by unlayering and working-around the critical empirical functional checkers one-by-one using the XREF file. Functional patterns are run at a higher frequency until first checker fails. If the checker is in the XREF file, clock adjust the associated latch (also in the XREF file) to improve the frequency. A representative clock adjust procedure is described in U.S. Pat. No. 5,455,931 "Programmable Clock Tuning System and Method" by Camporese et. al., although any clock adjust procedure may be used. Those skilled in the art after reading this will understand that it is a straightforward exercise to cross reference each latch to the adjustable clock that feeds it. Alternatively the clock associated with each latch may be added to the XREF file. If the checker changes repeat the process with the XREF file to work-around that failure. The process continues until both timing adjustment does not change the checker and frequency or the newly encountered checker is not in the XREF file. If there is no improvement or a checker is not in the XREF file, then prior method of consultation with design expertise is followed to attempt to work around that failure. If worked-around the previous procedure may be repeated. This is explained in more detail with respect to FIG. 6.

Figure 6:
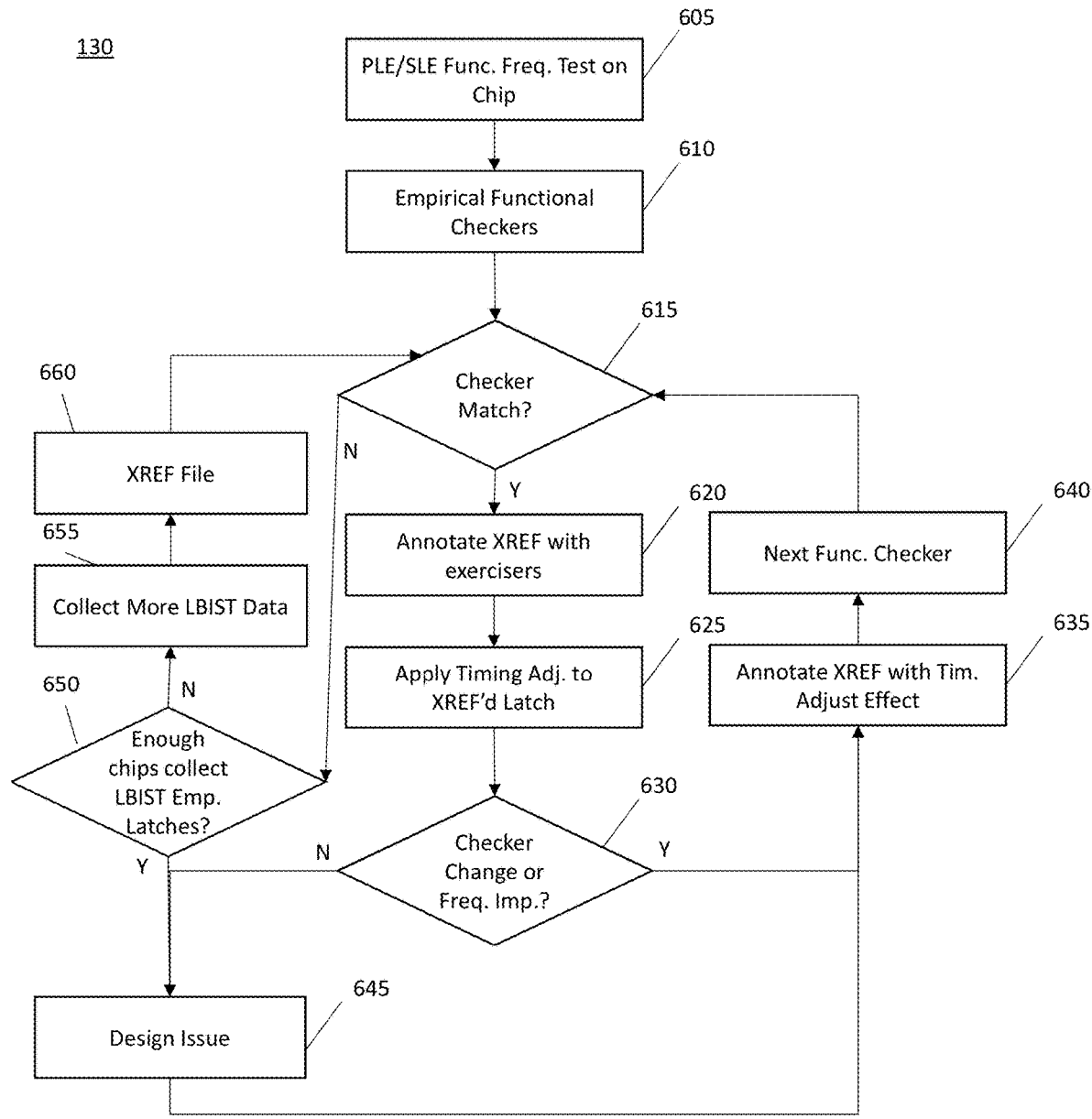
FIG. 6 depicts a post-silicon stage operation stage two method in accordance with one or more embodiments of the present invention.

FIG. 6 depicts a post-silicon stage operation stage two method 120 in accordance with one or more embodiments of the present invention. A functional frequency test, using a processor level exerciser, or system level exerciser on chip is performed (block 605) with empirical functional checkers (block 610). A test is made to see if there is a checker match in the XREF file (block 615). If so, the XREF file is annotated with processor level exerciser or system level exerciser columns flagged as appropriate (block 620) and a timing adjustment is applied to the latch determined by the XREF file (block 625). If there is a checker change or a frequency improvement (block 630), the XREF file is annotated with the timing adjustment effect (block 635) and the next function checker is selected (block 640). If there is no checker change or frequency improvement (block 630), there may be a design issue (block 645) and flow continues to block 635. The design issue usually will require manual design expert intervention. It may be a fundamental frequency limitation of the chip. Alternatively the limiting checker may be masked because it is not critical to the chip function or there may be other design options to bypass the checker or modify the logic.

If there is not a checker match (block 615), a test is made to determine if enough chips collected LBIST empirical latches (block 650). If so, there may be a design issue (block 645). If not, more LBIST data is collected (block 655 and the XREF file updated further (block 660) with flow continuing to block 615.

FIG. 7 depicts a sample XREF file 300 following the post-silicon stage operation two in accordance with one or more embodiments of the present invention. For the first latch, the injected latch in the simulation doesn't show checker in simulation: Thus the latch is a non-critical sensor. For the second latch, the checker in the simulation doesn't show in hardware LBIST, processor level exerciser, or system level exerciser, so this is a timing tool miscorrelation candidate. For the third latch, the checker in the simulation matches LBIST empirical fail only. One should add a workload to a processor level exerciser/system level exerciser, modify design, or adjust LBIST voltage specification to protect a customer. In this case a designer adds a workload to catch in processor level exerciser will be added.

For the fourth latch, the checker in the simulation shows only for system level exerciser. There is a possible system quality impact unless a workload is added to a processor level exerciser. For the fifth latch, the checker in the simulation shows for processor level exerciser, system level exerciser and latch shows for LBIST. This latch is a candidate for clock tuning and timing correlation. For the sixth latch, injecting LBIST empirically found latch identifies a checker, but the checker is not seen in hardware. The checker may be masked. For the seventh latch, the latch is found by LBIST, and the checker is found by system level exerciser. XREF found by clock adjusting latch that aggravated that checker, so there is a possible system quality impact unless workload added to processor level exerciser. Clock can't be tuned in this case. For the eight latch, injecting LBIST empirically found the latch identifies a checker, which is observed with processor level exerciser. This is a clock tune candidate and timing correlation candidate.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
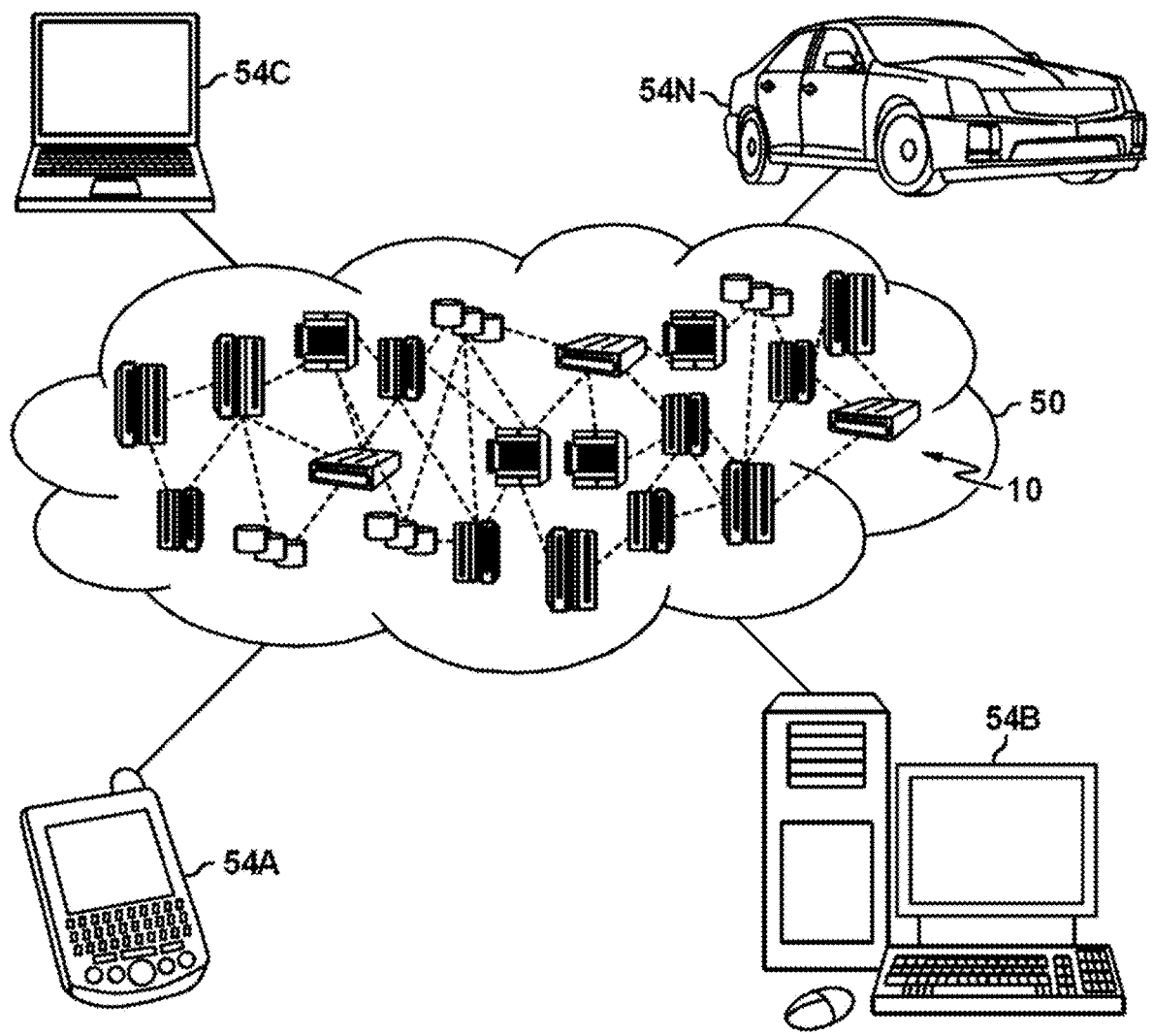
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
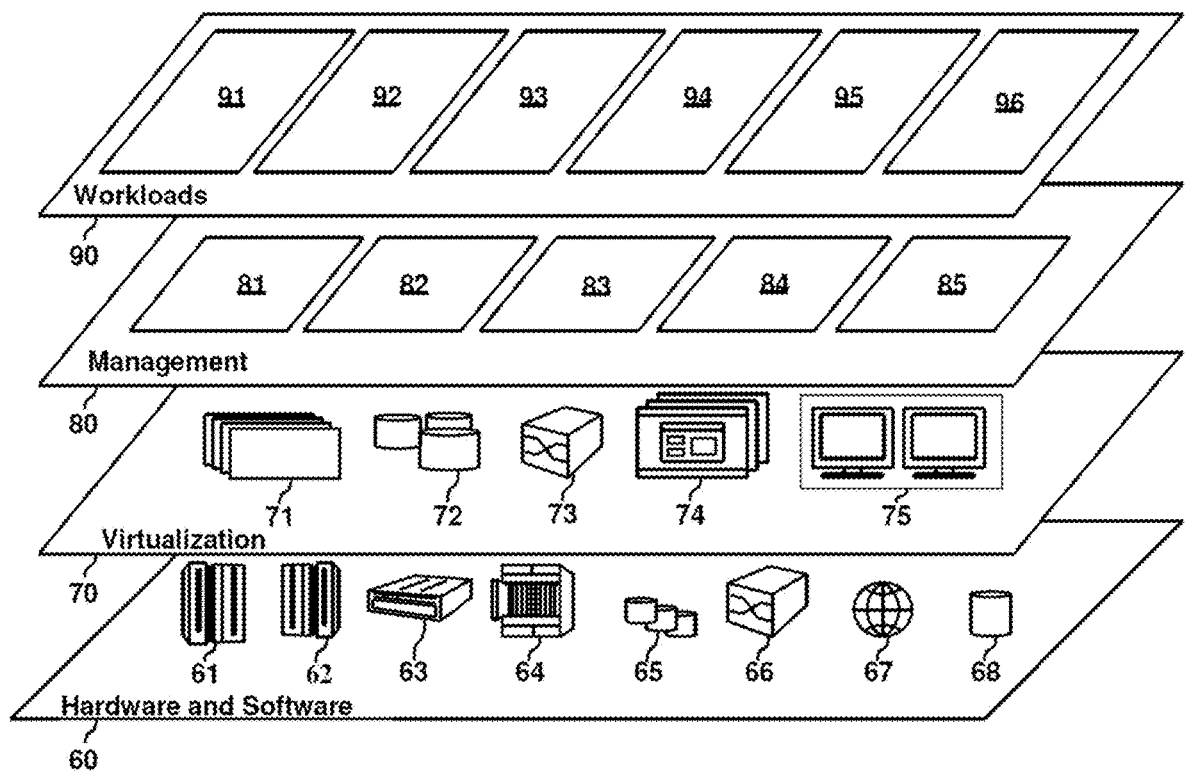
FIG. 9 depicts abstraction model layers according to one or more embodiments of the present invention.

Referring now to FIG. 9, a set of functional abstraction layers provided by cloud computing environment 50 (FIG. 4) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chip testing processing 96

Figure 10:
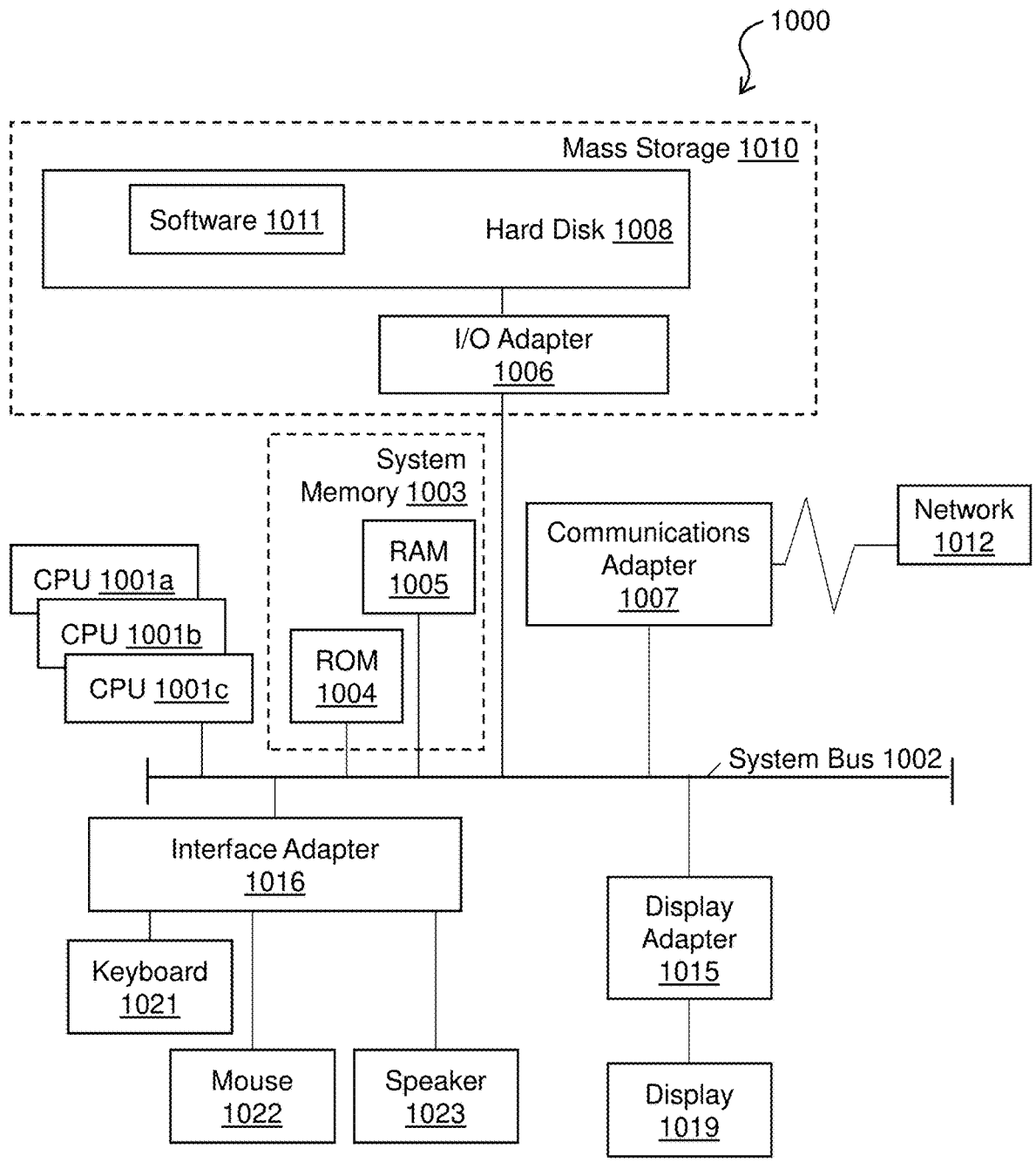
FIG. 10 depicts a computer system in accordance with one or more embodiments of the present invention.

Turning now to FIG. 10, a computer system 1000 is generally shown in accordance with an embodiment. The computer system 1000 can be an electronic, computer framework comprising and/or employing any number and combination of computing devices and networks utilizing various communication technologies, as described herein. The computer system 1000 can be easily scalable, extensible, and modular, with the ability to change to different services or reconfigure some features independently of others. The computer system 1000 may be, for example, a server, desktop computer, laptop computer, tablet computer, or smartphone. In some examples, computer system 1000 may be a cloud computing node such as a node 10 in FIG. 8. Computer system 1000 may be described in the general context of computer system executable instructions, such as program modules, being executed by a computer system. Generally, program modules may include routines, programs, objects, components, logic, data structures, and so on that perform particular tasks or implement particular abstract data types. Computer system 1000 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system 1000 has one or more central processing units (CPU(s)) 1001a, 1001b, 1001c, etc. (collectively or generically referred to as processor(s) 1001). The processors 1001 can be a single-core processor, multi-core processor, computing cluster, or any number of other configurations. The processors 1001, also referred to as processing circuits, are coupled via a system bus 1002 to a system memory 1003 and various other components. The system memory 1003 can include a read only memory (ROM) 1004 and a random access memory (RAM) 1005. The ROM 1004 is coupled to the system bus 1002 and may include a basic input/output system (BIOS), which controls certain basic functions of the computer system 1000. The RAM is read-write memory coupled to the system bus 1002 for use by the processors 1001. The system memory 1003 provides temporary memory space for operations of said instructions during operation. The system memory 1003 can include random access memory (RAM), read only memory, flash memory, or any other suitable memory systems.

The computer system 1000 comprises an input/output (I/O) adapter 1006 and a communications adapter 1007 coupled to the system bus 1002. The I/O adapter 1006 may be a small computer system interface (SCSI) adapter that communicates with a hard disk 1008 and/or any other similar component. The I/O adapter 1006 and the hard disk 1008 are collectively referred to herein as a mass storage 1010.

Software 1011 for execution on the computer system 1000 may be stored in the mass storage 1010. The mass storage 1010 is an example of a tangible storage medium readable by the processors 1001, where the software 1011 is stored as instructions for execution by the processors 1001 to cause the computer system 1000 to operate, such as is described herein below with respect to the various Figures. Examples of computer program product and the execution of such instruction is discussed herein in more detail. The communications adapter 1007 interconnects the system bus 1002 with a network 1012, which may be an outside network, enabling the computer system 1000 to communicate with other such systems. In one embodiment, a portion of the system memory 1003 and the mass storage 1010 collectively store an operating system, which may be any appropriate operating system, such as the z/OS or AIX operating system from IBM Corporation, to coordinate the functions of the various components shown in FIG. 10.

Additional input/output devices are shown as connected to the system bus 1002 via a display adapter 1015 and an interface adapter 1016 and. In one embodiment, the adapters 10010, 1007, 1015, and 1016 may be connected to one or more I/O buses that are connected to the system bus 1002 via an intermediate bus bridge (not shown). A display 1019 (e.g., a screen or a display monitor) is connected to the system bus 1002 by a display adapter 1015, which may include a graphics controller to improve the performance of graphics intensive applications and a video controller. A keyboard 1021, a mouse 1022, a speaker 1023, etc. can be interconnected to the system bus 1002 via the interface adapter 1016, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 10, the computer system 1000 includes processing capability in the form of the processors 1001, and, storage capability including the system memory 1003 and the mass storage 1010, input means such as the keyboard 1021 and the mouse 1022, and output capability including the speaker 1023 and the display 1019.

In some embodiments, the communications adapter 1007 can transmit data using any suitable interface or protocol, such as the internet small computer system interface, among others. The network 1012 may be a cellular network, a radio network, a wide area network (WAN), a local area network (LAN), or the Internet, among others. An external computing device may connect to the computer system 1000 through the network 1012. In some examples, an external computing device may be an external webserver or a cloud computing node.

It is to be understood that the block diagram of FIG. 10 is not intended to indicate that the computer system 1000 is to include all of the components shown in FIG. 10. Rather, the computer system 1000 can include any appropriate fewer or additional components not illustrated in FIG. 10 (e.g., additional memory components, embedded controllers, modules, additional network interfaces, etc.). Further, the embodiments described herein with respect to computer system 1000 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
executing, by one or more processors, a pre-silicon operation on a simulated chip, the pre-silicon operation verifying that a plurality of latches from a timing simulation set error checkers when run against a manufacturing test suite and generating a cross-reference file containing latch entries in a table, with each latch entry and its associated checker having an associated error checker;
executing, by the one or more processors, a first post-silicon operation on a hardware chip that was built based on the simulated chip to determine that timing latches from logic built-in self tests (LBISTs) trigger the same error checkers set by the plurality of latches verified in the pre-silicon operation and updating the cross-reference file based on the results of the determination;
executing, by the one or more processors, a second post-silicon operation on the hardware chip to improve chip frequency by unlayering and working around functional checkers using the cross-reference file, and updating the cross-reference file based on the results of the improving; and
providing, by the one or more processors, the cross-reference file to a user.

2. The method of claim 1, wherein verifying in the pre-silicon operation comprises determining if a checker is set by a latch from the plurality of latches and updating the cross-reference file with the latch and its associated checker.

3. The method of claim 1, wherein determining in the first post-silicon operation comprises determining if a latch is already listed in the cross-reference file and annotating the cross-reference file with a flag denoting its triggering by the LBIST.

4. The method of claim 3, wherein determining in the first post-silicon operation further comprises determining that a latch is not already listed in the cross-reference file and adding the latch to the cross-reference file with the latch and its associated checker.

5. The method of claim 1, wherein improving in the second post-silicon operation comprises performing functional frequency tests on the hardware chip.

6. The method of claim 5, wherein improving in the second post-silicon operation further comprises determining that there is a checker match and annotating the cross-reference file with a processor level exerciser or system level exerciser flag.

7. The method of claim 6, wherein improving in the second post-silicon operation further comprises applying a timing adjustment to a latch in the cross-reference file that has a processor level exerciser or system level exerciser flag.

8. A system comprising:
a memory having computer readable instructions; and
one or more processors for executing the computer readable instructions, the computer readable instructions controlling the one or more processors to perform operations comprising:
executing, by the one or more processors, a pre-silicon operation on a simulated chip, the pre-silicon operation verifying that a plurality of latches from a timing simulation set error checkers when run against a manufacturing test suite and generating a cross-reference file containing latch entries in a table, with each latch entry having an associated error checker;
executing, by the one or more processors, a first post-silicon operation on a hardware chip that was built based on the simulated chip to determine that timing latches from logic built-in self tests (LBISTs) trigger the same error checkers set by the plurality of latches verified in the pre-silicon operation and updating the cross-reference file based on the results of the determination;
executing, by the one or more processors, a second post-silicon operation on the hardware chip to improve chip frequency by unlayering and working around functional checkers using the cross-reference file, and updating the cross-reference file based on the results of the improving; and
providing, by the one or more processors, the cross-reference file to a user.

9. The system of claim 8, wherein verifying in the pre-silicon operation comprises determining if a checker is set by a latch from the plurality of latches and updating the cross-reference file with the latch and its associated checker.

10. The system of claim 8, wherein determining in the first post-silicon operation comprises determining if a latch is already listed in the cross-reference file and annotating the cross-reference file with a flag denoting its triggering by the LBIST.

11. The system of claim 10, wherein determining in the first post-silicon operation further comprises determining that a latch is not already listed in the cross-reference file and adding the latch to the cross-reference file with the latch and its associated checker.

12. The system of claim 8, wherein improving in the second post-silicon operation comprises performing functional frequency tests on the hardware chip.

13. The system of claim 12, wherein improving in the second post-silicon operation further comprises determining that there is a checker match and annotating the cross-reference file with a processor level exerciser or system level exerciser flag.

14. The system of claim 13, wherein improving in the second post-silicon operation further comprises applying a timing adjustment to a latch in the cross-reference file that has a processor level exerciser or system level exerciser flag.

15. A computer program product comprising a computer readable storage medium having program instructions embodied therewith, the program instructions executable by one or more processors to cause the one or more processors to perform operations comprising:
executing, by the one or more processors, a pre-silicon operation on a simulated chip, the pre-silicon operation verifying that a plurality of latches from a timing simulation set error checkers when run against a manufacturing test suite and in order to generate a cross-reference file containing latch entries in a table, with each latch entry having an associated error checker;
executing, by the one or more processors, a first post-silicon operation on a hardware chip that was built based on the simulated chip to determine empirically that timing latches from logic built-in self tests ("LBISTs") trigger the same error checkers set by the plurality of latches verified in the pre-silicon operation simulated chip and updating the cross-reference file based on the results of the determination;
executing, by the one or more processors, a second post-silicon operation on the hardware chip to improve chip frequency by unlayering and working around functional checkers using the cross-reference file, and updating the cross-reference file based on the results of the improving; and providing, by the one or more processors, the cross-reference file to a user.

16. The computer program product of claim 15, wherein determining in the first post-silicon operation comprises determining if a latch is already listed in the cross-reference file and annotating the cross-reference file with a flag denoting its triggering by the LBIST.

17. The computer program product of claim 16, wherein determining in the first post-silicon operation further comprises determining that a latch is not already listed in the cross-reference file and adding the latch to the cross-reference file with the latch and its associated checker.

18. The computer program product of claim 15, wherein improving in the second post-silicon operation comprises performing functional frequency tests on the hardware chip.

19. The computer program product of claim 18, wherein improving in the second post-silicon operation further comprises determining that there is a checker match and annotating the cross-reference file with a processor level exerciser or system level exerciser flag.

20. The computer program product of claim 19, wherein improving in the second post-silicon operation comprises applying a timing adjustment to a latch in the cross-reference file that has a processor level exerciser or system level exerciser flag.

\* \* \* \* \*